(12) United States Patent
Li et al.

(10) Patent No.: US 9,523,901 B2
(45) Date of Patent: Dec. 20, 2016

(54) ARRAY SUBSTRATE, LIQUID CRYSTAL PANEL AND LIQUID CRYSTAL DISPLAY DEVICE

(71) Applicant: Shenzhen China Star Optoelectronics Technology Co., Ltd., Shenzhen, Guangdong (CN)

(72) Inventors: Qianqian Li, Guangdong (CN); Je-hao Hsu, Guangdong (CN); Caiqin Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 145 days.

(21) Appl. No.: 14/426,386

(22) PCT Filed: Nov. 12, 2014

(86) PCT No.: PCT/CN2014/090949
§ 371 (c)(1),
(2) Date: Mar. 5, 2015

(87) PCT Pub. No.: WO2016/074180
PCT Pub. Date: May 19, 2016

(65) Prior Publication Data
US 2016/0334684 A1 Nov. 17, 2016

(30) Foreign Application Priority Data
Nov. 10, 2014 (CN) .......................... 2014 1 0627556

(51) Int. Cl.
*G09G 3/36* (2006.01)
*G02F 1/1362* (2006.01)
(Continued)

(52) U.S. Cl.
CPC ....... *G02F 1/136286* (2013.01); *G02F 1/1368* (2013.01); *G02F 1/133514* (2013.01)

(58) Field of Classification Search
CPC .................................................. G09G 3/3614
See application file for complete search history.

(56) References Cited

U.S. PATENT DOCUMENTS 8,773,419 B2 * 7/2014 Nam .................... G09G 3/3648
345/204
9,024,850 B2 * 5/2015 Lee ................... G02F 1/136286
345/104

(Continued)

*Primary Examiner* — Timothy L Rude
(74) *Attorney, Agent, or Firm* — Andrew C. Cheng

(57) ABSTRACT

The invention provides an array substrate including an array of sub-pixels, multiple data lines and multiple scan lines. The array of sub-pixels is divided into multiple column groups along the arrangement direction of the data lines and divided into multiple row groups along the arrangement direction of the scan lines. By the arrangement design of a connection manner of the sub-pixels with the data lines and scan lines in the array substrate, when is driven by a dot inversion method, each column of sub-pixels have intervally arranged well-charged sub-pixels and poorly-charged sub-pixels, so that in a liquid crystal panel including the array substrate, brightnesses of various areas are balanced on the whole and the drawback of the existence of bright and dark lines in the vertical direction is improved. A liquid crystal panel including the array substrate, and a corresponding liquid crystal display device also are provided.

15 Claims, 6 Drawing Sheets

(51) Int. Cl.
    *G02F 1/1368*  (2006.01)
    *G02F 1/1335*  (2006.01)

(56) References Cited

U.S. PATENT DOCUMENTS

| | | | |
|---|---|---|---|
| 9,129,570 B2 * | 9/2015 | Cho | G09G 3/3607 |
| 9,183,809 B2 * | 11/2015 | Jeong | G09G 5/001 |
| 9,224,348 B2 * | 12/2015 | Kim | G09G 3/3614 |
| 2014/0125647 A1 * | 5/2014 | Shin | G09G 3/3648 345/212 |
| 2015/0015623 A1 * | 1/2015 | Yang | G09G 3/3648 345/697 |
| 2015/0061983 A1 * | 3/2015 | Kim | G09G 3/3233 345/82 |
| 2016/0131954 A1 * | 5/2016 | Li | G02F 1/136286 349/46 |

* cited by examiner

ARRAY SUBSTRATE, LIQUID CRYSTAL PANEL AND LIQUID CRYSTAL DISPLAY DEVICE

TECHNICAL FIELD

The present invention relates to the field of liquid crystal display technology, and particularly to an array substrate, a liquid crystal panel and a liquid crystal display device.

DESCRIPTION OF RELATED ART

The liquid crystal display (LCD) device is a type of an ultrathin flat display device, and the liquid crystal panel is an important part of the liquid crystal display device. Generally, the liquid crystal panel at least includes oppositely-disposed array substrate and color filter substrate and a liquid crystal layer arranged between the array substrate and the color filter substrate. The array substrate is formed with a pixel array and mutually intersected data lines and scan lines. The data lines are configured to supply data signals to the pixel array, and the scan lines are configured to supply scan signals to the pixel array. In a traditional array substrate, pixels in a same column are connected to a same data line and thereby the data line is responsible for supplying data signals to all the pixels in the same column; pixels in a same row are connected to a same scan line and thereby the scan line is responsible for supplying scan signals to all the pixels in the same row. Moreover, in the array substrate, there are various types of arrangement designs for the data lines and scan lines, and one of the arrangement designs can reduce a half of data lines, i.e., the arrangement type of data line share (DLS)

FIG. 1 is a schematic partial structural view of a conventional DLS array substrate. In particular, the array substrate is formed with an array of sub-pixels P11, P12, P13, P22, P23 and mutually intersected data lines D1~D5 and scan lines G1~G6. Horizontally adjacent sub-pixels in the array share one data line (e.g., P12 and P13 share the data line D2, P22 and P23 share the data line D2), so that the number/amount of the data lines is reduced to be a half of the data lines of the traditional pixel array. Adjacent sub-pixels in a same row are connected to different scan lines (e.g., P12 and P13 are respectively connected to the scan lines G1 and G2), sub-pixels in a same row spaced by one sub-pixels are connected to a same scan line (e.g., P11 and P13 both are connected to the scan line G2), and vertically adjacent sub-pixels are connected to different scan lines (e.g., P12 and P22 are respectively connected to the scan lines G2 and G3), so that the number/amount of the scan lines is twice of that of the traditional pixel array.

Since the number of the scan lines is doubled, the scan time assigned to each scan line is reduced, so that the charging time of sub-pixel is reduced. Current liquid crystal panel generally adopts the dot inversion driving method, i.e., signal polarities of adjacent two data lines are opposite and signal polarities of adjacent rows of a same data line also are opposite. Since the data line has a certain resistance, the data signal would have the delay and distortion of waveform during transmission on the data line, resulting in a charging ratio difference of sub-pixels in adjacent columns of the data line. Referring to the driving signal waveform diagram as shown in FIG. 2, D(odd) is a signal waveform of an odd data line, D(even) is a signal waveform of an even data line, the signal polarities of D(odd) and D(even) are opposite. In the driving signal waveform diagram, the dashed line is the theoretical signal waveform diagram, and the solid line is the actual waveform diagram formed after the delay and distortion. When D(even) is the data line D2, with reference to FIG. 1, when G1~G4 are sequentially turned on, the D2 sequentially charges the sub-pixels P12, P13, P22 and P23, the D2 charges two sub-pixels P12, P13 or P22, P23 in one signal polarity period. However, in one signal polarity period, owing to the signal distortion, the previously charged sub-pixels P12, P22 are insufficiently/poorly charged and thus have a relatively low brightness, and the latterly charged sub-pixels P13, P23 are well charged and thus have a relatively high brightness, so that significant bright and dark lines are generated. Accordingly, the whole liquid crystal panel would generate multiple alternate bright and dark vertical lines and thus the display quality is degraded.

Based on the above situation, there is a need of improving the bright and dark lines of liquid crystal panel.

SUMMARY

In view of the drawbacks of the prior art, the invention provides an array substrate, by the arrangement design of an connection manner of sub-pixels with data lines and scan lines in the array substrate, bright and dark vertical lines in a liquid crystal panel including the array substrate would be improved.

In order to achieve the above objective, the invention proposes the following technical solution.

Specifically, an array substrate includes an array of sub-pixels, a plurality of data lines and a plurality of scan lines.

Each two data lines define a column group arranged therebetween. Each column group includes two columns of sub-pixels. Sub-pixels in an odd column group each are connected to one of two data lines at two sides of the column group which is closer to the sub-pixel. Sub-pixels in odd rows of an even column group each are connected to one of two data lines at two sides of the column group which is closer to the sub-pixel. Sub-pixels in even rows of the even column group each are connected to one of two data lines at two sides of the column group which is farther to the sub-pixel.

Top and bottom of each row of sub-pixels are disposed with scan lines only for driving the row of sub-pixels. The array of sub-pixels is divided into a plurality of row groups. Each row group includes one row or two rows of sub-pixels. Sub-pixels in even column groups of each row of an nth row group each are connected to the scan line on top of the row of sub-pixels, and sub-pixels in odd column groups of each row of the nth row group each are connected to the scan line on bottom of the row of sub-pixels. ith and (i+1)th sub-pixels in each row of an (n+1)th row group each are connected to the scan line on top of the row of sub-pixels, and jth and (j+3)th sub-pixels in each row of the (n+1)th row group each are connected to the scan line on bottom of the row of sub-pixels. Sub-pixels in odd column groups of each row of an (n+2)th row group each are connected to the scan line on top of the row of sub-pixels, and sub-pixels in even column groups of each row of the (n+2)th row group each are connected to the scan line on bottom of the row of sub-pixels. jth and (j+3)th sub-pixels in each row of an (n+3)th row group each are connected to the scan line on top of the row of sub-pixels, and ith and (i+1)th sub-pixels in each row of the (n+3)th row group each are connected to the scan line on bottom of the row of sub-pixels. Where, n=1, 5, 9, . . . , n−4, n; i=2, 6, 10, . . . , i−4, i; and j=1, 5, 9, . . . , j−4, j.

In an exemplary embodiment, each sub-pixel is connected to a corresponding data line and a corresponding scan line by a switching element.

In an exemplary embodiment, the switching element is a thin film transistor. A gate of the thin film transistor is electrically connected to the corresponding scan line, a source of the thin film transistor is electrically connected to the corresponding data line, and a drain of the thin film transistor is electrically connected to the corresponding sub-pixel.

The invention further provides a liquid crystal panel. The liquid crystal panel includes a display unit. The display unit includes oppositely disposed array substrate and color filter substrate and a liquid crystal layer disposed between the array substrate and the color filter substrate. The array substrate includes an array of sub-pixels, a plurality of data lines and a plurality of scan lines.

In particular, each two data lines define a column group arranged therebetween. Each column group includes two columns of sub-pixels. Sub-pixels in an odd column group each are connected to one of two data lines at two sides of the column group which is closer to the sub-pixel. Sub-pixels in odd rows of an even column group each are connected to one of two data lines at two sides of the column group which is closer to the sub-pixel. Sub-pixels in even rows of the even column group each are connected to one of two data lines at two sides of the column group which is farther to the sub-pixel.

Top and bottom of each row of sub-pixels are disposed with scan lines only for driving the row of sub-pixels. The array of sub-pixels is divided into a plurality of row groups. Each row group includes one row or two rows of sub-pixels. Sub-pixels in even column groups of each row of an nth row group each are connected to the scan line on top of the row of sub-pixels, and sub-pixels in odd column groups of each row of the nth row group each are connected to the scan line on bottom of the row of sub-pixels. ith and (i+1)th sub-pixels in each row of an (n+1)th row group each are connected to the scan line on top of the row of sub-pixels, and jth and (j+3)th sub-pixels in each row of the (n+1)th row group each are connected to the scan line on bottom of the row of sub-pixels. Sub-pixels in odd column groups of each row of an (n+2)th row group each are connected to the scan line on top of the row of sub-pixels, and sub-pixels in even column groups of each row of the (n+2)th row group each are connected to the scan line on bottom of the row of sub-pixels. jth and (j+3)th sub-pixels in each row of an (n+3)th row group each are connected to the scan line on top of the row of sub-pixels, and ith and (i+1)th sub-pixels in each row of the (n+3)th row group each are connected to the scan line on bottom of the row of sub-pixels. Where, n=1, 5, 9, . . . , n−4, n; i=2, 6, 10, . . . , i−4, i; and j=1, 5, 9, . . . , j−4, j.

In an exemplary embodiment, each sub-pixel is connected to a corresponding data line and a corresponding scan line by a switching element.

In an exemplary embodiment, the switching element is a thin film transistor. A gate of the thin film transistor is electrically connected to the corresponding scan line, a source of the thin film transistor is electrically connected to the corresponding data line, and a drain of the thin film transistor is electrically connected to the corresponding sub-pixel.

In an exemplary embodiment, the liquid crystal panel includes a gate driver and a source driver. The gate driver is configured (i.e., structured and arranged) for supplying scan signals to the array of sub-pixels through the plurality of scan lines, and the source driver is configured for supplying data signals to the array of sub-pixels through the plurality of data lines.

In an exemplary embodiment, the array of sub-pixels includes a red sub-pixel, a green sub-pixel and a blue sub-pixel.

In an exemplary embodiment, the liquid crystal panel is driven by a dot inversion driving method.

Another aspect of the invention provides a liquid crystal display device. The liquid crystal display device includes a liquid crystal panel and a backlight module. The liquid crystal panel and the backlight module are oppositely disposed. The backlight module is configured for providing a display light source for the liquid crystal panel and thereby facilitating the liquid crystal panel to display an image. The liquid crystal panel is any one of the above-described liquid crystal panels.

Compared with the prior art, the array substrate provided by the embodiments of the invention, by way of the arrangement design of the connection manner of the sub-pixels with the data lines and the scan lines in the array substrate, when is driven by a dot inversion driving method, each column of sub-pixels would have intervally disposed well-charged sub-pixels and poorly-charged sub-pixels (herein, "well-charged" and "poorly-charged" are relative terms), so that in a liquid crystal panel including the array substrate, brightnesses of various areas are balanced on the whole and the drawback of the existence of bright and dark vertical lines can be improved consequently.

BRIEF DESCRIPTION OF THE DRAWINGS

The above and other aspects, features and advantages of embodiments of the present invention will be more apparent from the following detailed description taken in conjunction with the accompanying drawings, in which.

DETAILED DESCRIPTION OF EMBODIMENTS

Figure 1:
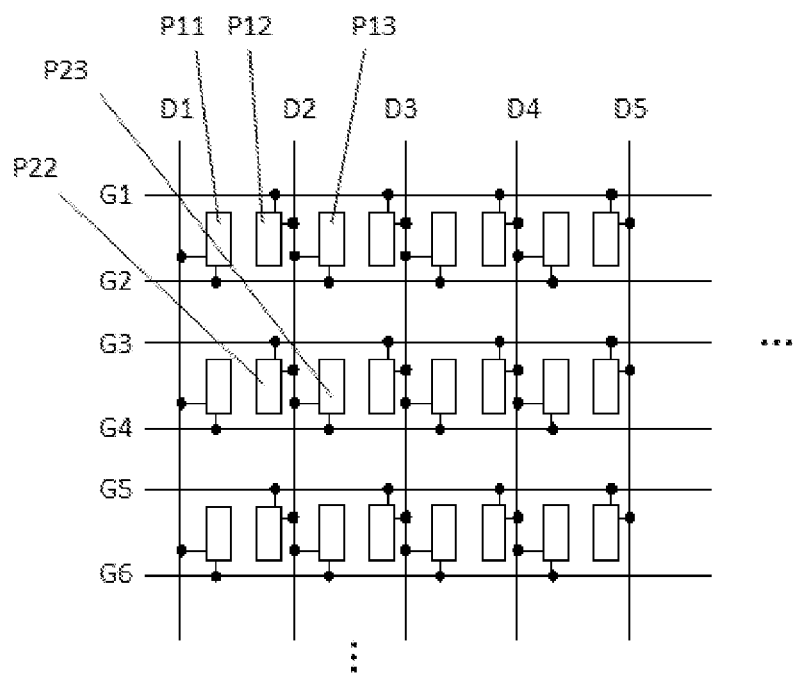
FIG. 1 is a schematic partial structural view of a conventional data line share type array substrate.
Figure 2:
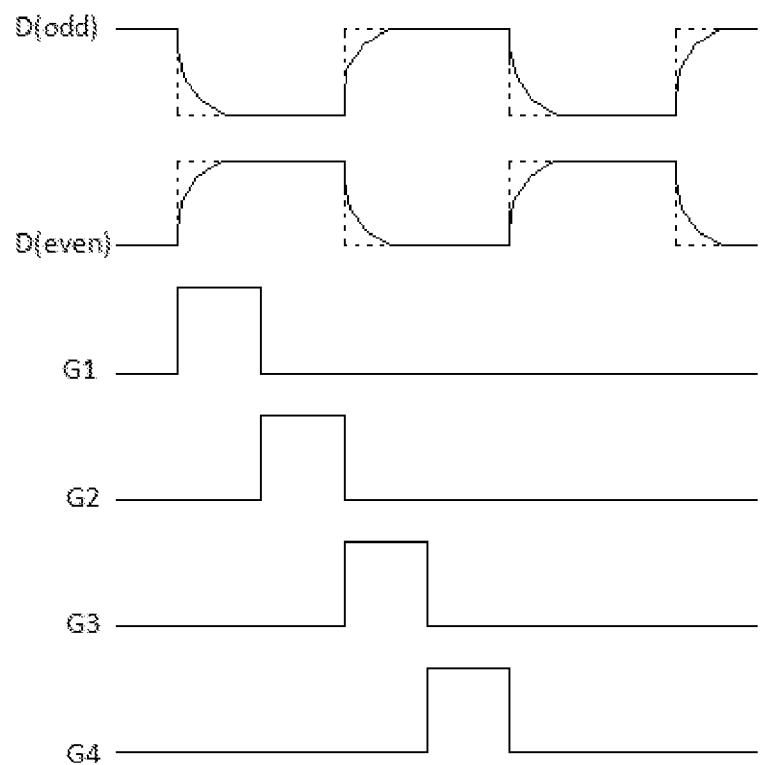
FIG. 2 is a signal waveform diagram of a dot inversion driving method.

As described in the foregoing, the invention addresses the drawbacks of the existence of bright and dark vertical lines of the data line share (DLS) type liquid crystal panel and therefore provides an array substrate. The array substrate includes an array of sub-pixels and mutually intersected a plurality of data lines and a plurality of scan lines. By way of the arrangement design of a connection manner of the sub-pixels with the data lines and the scan lines, when is driven by a dot inversion driving method, each column of sub-pixels would have intervally arranged well-charged sub-pixels and poorly-charged sub-pixels.

For the connection manner of the sub-pixels with the data lines: in the plurality of data lines, each two data lines define a column group arranged therebetween, and each column group includes two columns of sub-pixels.

For sub-pixels in an odd column group, each sub-pixel is connected to one of the two data lines at two sides of the odd column group which is closer to the sub-pixel (i.e., the closer one data line). For sub-pixels in odd rows of an even column group, each sub-pixel is connected to one of the two data lines at two sides of the even column group. For sub-pixels in even rows of the even column group, each sub-pixel is connected to one of the two data lines at two sides of the even column group which is father to the sub-pixel (i.e., the farther one data line). Herein, "closer" and "farther" are relative terms.

For the connection manner of the sub-pixels with the scan lines: firstly, in the plurality of scan lines, top and bottom of each row of sub-pixels respectively are disposed with two scan lines only for driving the row of sub-pixels; and then the array of sub-pixels is divided into a plurality of row groups, and each row group includes one row or two rows of sub-pixels.
Specifically:

For sub-pixels in even column groups of each row of an nth row group, each sub-pixel is connected to the scan line on top of the row of sub-pixel (i.e., top scan line); and for sub-pixels in odd column groups of each row of the nth row group, each sub-pixel is connected to the scan line on bottom of the row of sub-pixels (i.e., bottom scan line).

For ith and (i+1)th sub-pixels in each row of an (n+1)th row group, each sub-pixel is connected to the scan line on top of the row of sub-pixels; and for jth and (j+3)th sub-pixels in each row of the (n+1)th row group, each sub-pixel is connected to the scan line on bottom of the row of sub-pixels.

For sub-pixels in odd column groups of each row of an (n+2)th row group, each sub-pixel is connected to the scan line on top of the row of sub-pixels; and for sub-pixels in even column groups of each row of the (n+2)th row group, each sub-pixel is connected to the scan line on bottom of the row of sub-pixels.

For jth and (j+3)th sub-pixels in each row of an (n+3)th row group, each sub-pixel is connected to the scan line on top of the row of sub-pixels; and for ith and (i+1)th sub-pixels in each row of the (n+3)th row group, each sub-pixel is connected to the scan line on bottom of the row of sub-pixels.

Where, n=1, 5, 9, . . . , n−4, n; i=2, 6, 10, . . . , i−4, i; and j=1, 5, 9, . . . , j−4, j.

For the above described connection manner of the sub-pixels with the scan lines, when each row group includes two rows of sub-pixels, the connection manner of one row of sub-pixels in the row group with data lines and scan lines is the same as the connection manner of the other one row of sub-pixels in the row group with data lines and scan lines, i.e., two rows of sub-pixels are used as a repeating unit.

In order to make that the objectives, technical solutions and advantages of the invention will be more clearly under-stood, the invention will be further described by embodiments thereof with reference to accompanying drawings.

[Embodiment 1]

Figure 3:
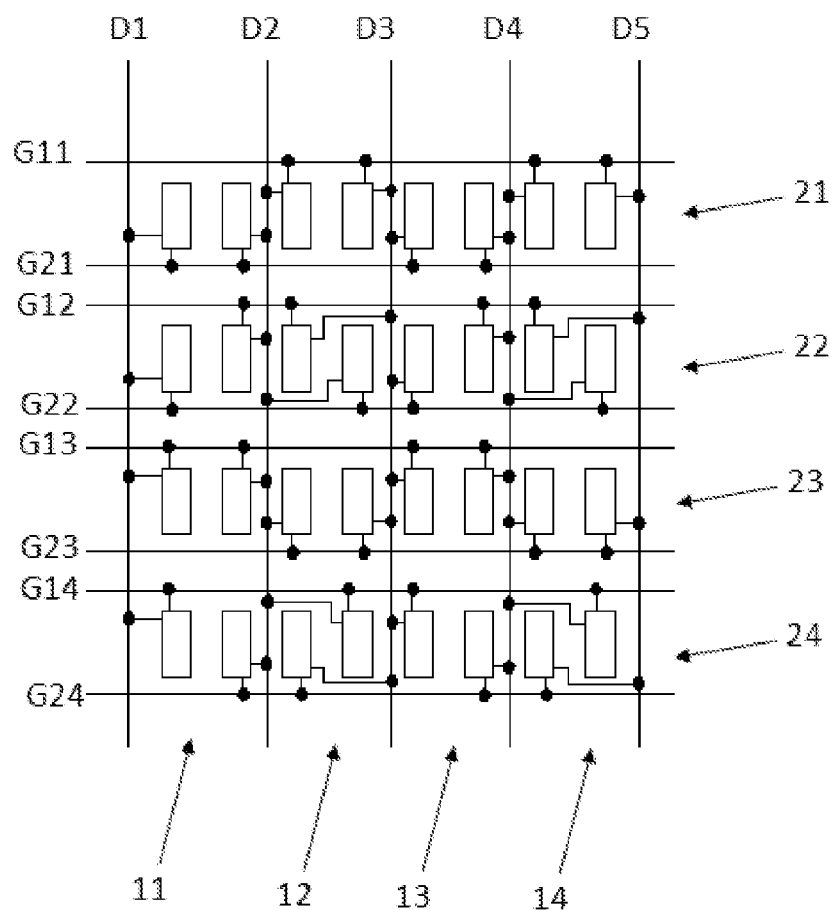
FIG. 3 is a schematic partial structural view of a data line share type array substrate according to embodiment 1 of the invention.

FIG. 3 is a schematic partial structural view of an array substrate provided by this embodiment. Hereinafter, Pxy represent specific sub-pixels, where x=1~4, y=1~8. For example, in FIG. 3, P11 is the first sub-pixel at the top-left corner, and P48 is the last sub-pixel at the bottom-right corner.

As shown in FIG. 3, in data lines D1~D5, each two data lines define a corresponding one of column groups 11, 12, 13, 14 arranged therebetween, and each column group includes two columns of sub-pixels, e.g., the column group 11 in FIG. 3 includes the first and the second columns of sub-pixels.

In particular, for the sub-pixels in the odd column groups 11, 13, each sub-pixel is connected to one of the two data lines at two sides of the column group which is closer to the sub-pixel, e.g., for the sub-pixels in the column group 11, the sub-pixels P1y are connected to the data line D1, and the sub-pixels P2y are connected to the data line D2. For the sub-pixels in odd rows of the even column groups 12, 14, each sub-pixel is connected to one of the two data lines at two sides of the column group which is closer to the sub-pixel, e.g., for the sub-pixels P13, P14 in the first row of the column group 12, the sub-pixel P13 is connected to the data line D2, and the sub-pixel P14 is connected to the data line D3. For the sub-pixels in even rows of the even column groups 12, 14, each sub-pixel s connected to one of the two data lines at two sides of the column group which is farther to the sub-pixel, e.g., for the sub-pixels P23, P24 in the second row of the column group 12, the sub-pixel P23 is connected to the data line D3, and the sub-pixel P24 is connected to the data line D2. Herein, "closer" and "farther" are relative terms.

In scan lines G11~G14 and G21~G24, top and bottom of each row of sub-pixels respectively are disposed with two scan lines only for driving the row of sub-pixels, e.g., the scan lines on top and bottom of the first row of sub-pixels respectively are G11, G21, and the scan lines G11, G21 only are for driving the first row of sub-pixels. Moreover, the array of sub-pixels is divided into row groups 21, 22, 23, 24. In this embodiment, each row group includes one row of sub-pixels, i.e., the row group 21 includes the first row of sub-pixels, the row group 22 includes the second row of sub-pixels, and so on.

The connection manner of sub-pixels with the scan lines will be described as follows.

For sub-pixels in the even column groups 12, 14 of the row group 21, each sub-pixel is connected to the scan line on top of the row of sub-pixels, e.g., for the sub-pixels P13, P14 in the even column group 12 of the row group 21, the sub-pixels P13, P14 both are connected to the scan line G11. For sub-pixels in the odd column groups 11, 13 of the row group 21, each sub-pixel is connected to the scan line on bottom of the row of sub-pixels, e.g., for the sub-pixels P11, P12 in the odd column group 11 of the row group 21, the sub-pixels P11, P12 both are connected to the scan line G21.

For ith and (i+1)th sub-pixels in each row of the row group 22, each sub-pixel is connected to the scan line on top of the row of sub-pixels, e.g., for the second and third sub-pixels P22, P23 in the row group 22, the sub-pixels P22, P23 are connected to the scan line G12. For jth and (j+3)th sub-pixels in each row of the row group 22, each sub-pixel is connected to the scan line on bottom of the row of sub-pixels, e.g., for the first and fourth sub-pixels P21, P24 in the row group 22, the sub-pixels P21, P24 are connected to the scan line G22. Herein, i=2, 6; j=1, 5.

For sub-pixels in the odd column groups 11, 13 of each row of the row group 23, each sub-pixel is connected to the scan line on top of the row of sub-pixels, e.g., for the sub-pixels P31, P32 in the odd column group 11 of the row group 23, the sub-pixels P31, P32 both are connected to the scan line G13. For sub-pixels in the even column groups 12, 14 of each row of the row group 23, each sub-pixel is connected to the scan line on bottom of the row of sub-pixels, e.g., for the sub-pixels P33, P34 in the even column group 12 of the row group 23, the sub-pixels P33, P34 both are connected to the scan line G23.

For jth and (j+3)th sub-pixels in each row of the row group 24, each sub-pixel is connected to the scan line on top of the row of sub-pixels, e.g., for the first and fourth sub-pixels P41, P44 in the row group 24, the sub-pixels P41, P44 are connected to the scan line G14. For ith and (i+1)th sub-pixels in each row of the row group 24, each sub-pixel is connected to the scan line on bottom of the row of sub-pixels, e.g., for the second and third sub-pixels P42, P43 in the row group 24, the sub-pixels P42, P43 are connected to the scan line G24. Herein, i=2, 6; j=1, 5.

Figure 4:
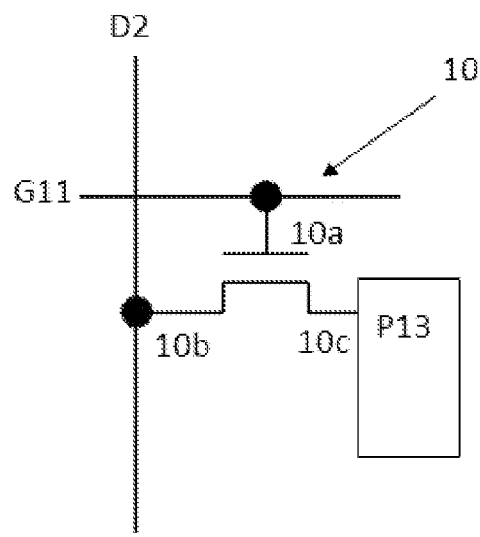
FIG. 4 is a schematic structural view of a sub-pixel connecting a data line and a scan line through a thin film transistor according to an embodiment of the invention.

Each sub-pixel Pxy is connected to a corresponding data line and a corresponding scan line by a switching element 10. Specifically, the sub-pixel P13 is taken as an example, as illustrated in FIG. 4, the switching element in this embodiment is a thin film transistor (TFT). A gate 10a of the TFT is electrically connected to the corresponding scan line G11, a source 10b of the TFT is electrically connected to the corresponding data line D2, and a drain 10c of the TFT is electrically connected to the sub-pixel P13.

When a dot inversion driving method is employed, the charging of the sub-pixels P12, P13, P22, P23, P32, P33, P42, P43 at two sides of the data line D2 is taken as an example, with reference to FIG. 3, G11, G21, . . . , G14, G24 are sequentially turned on, the sub-pixels P12, P13, P22, P32, P33, P42 are charged by the data line D2 and the sub-pixels P23, P43 are charged by the data line D3. For the sub-pixels in the Px2 column, P12 and P42 are well-charged sub-pixels, while P22 and P32 are poorly-charged sub-pixels. For the sub-pixels in the Px3 column, P33 and P43 are well-charged sub-pixels, while P13 and P23 are poorly-charged sub-pixels.

Figure 5:
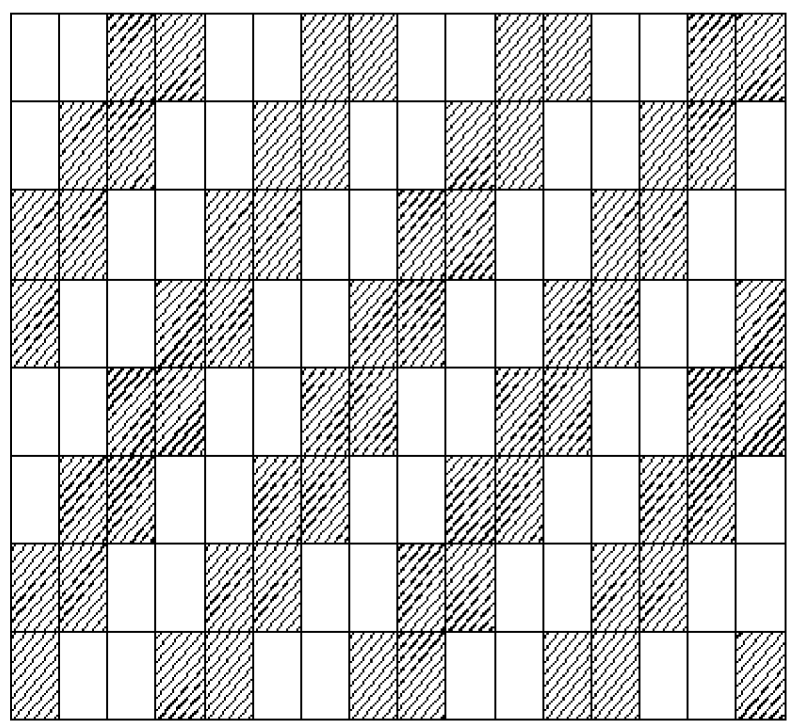
FIG. 5 is a schematic view of the array substrate after being charged according to the embodiment 1 of the invention.

An array substrate provided by this embodiment of the invention can be regarded as a structure obtained by repeating the partial structure as shown in FIG. 3 along transversal and longitudinal directions multiple times. FIG. 5 shows a distribution of well-charged sub-pixels and poorly-charged sub-pixels of the array substrate with the structure in a frame of image. In FIG. 5, the white areas represent well-charged sub-pixels, and the shaded areas represent poorly-charged sub-pixels. It can be found that, the sub-pixels in a same column have intervally arranged well-charged sub-pixels and poorly-charged sub-pixels, and the sub-pixels in a same row also have intervally arranged well-charged sub-pixels and poorly-charged sub-pixels. Accordingly, in a liquid crystal panel including the array substrate, brightnesses of various areas are balanced on the whole and thus the drawback of the existence of bright and dark vertical lines can be improved.

[Embodiment 2]

Figure 6:
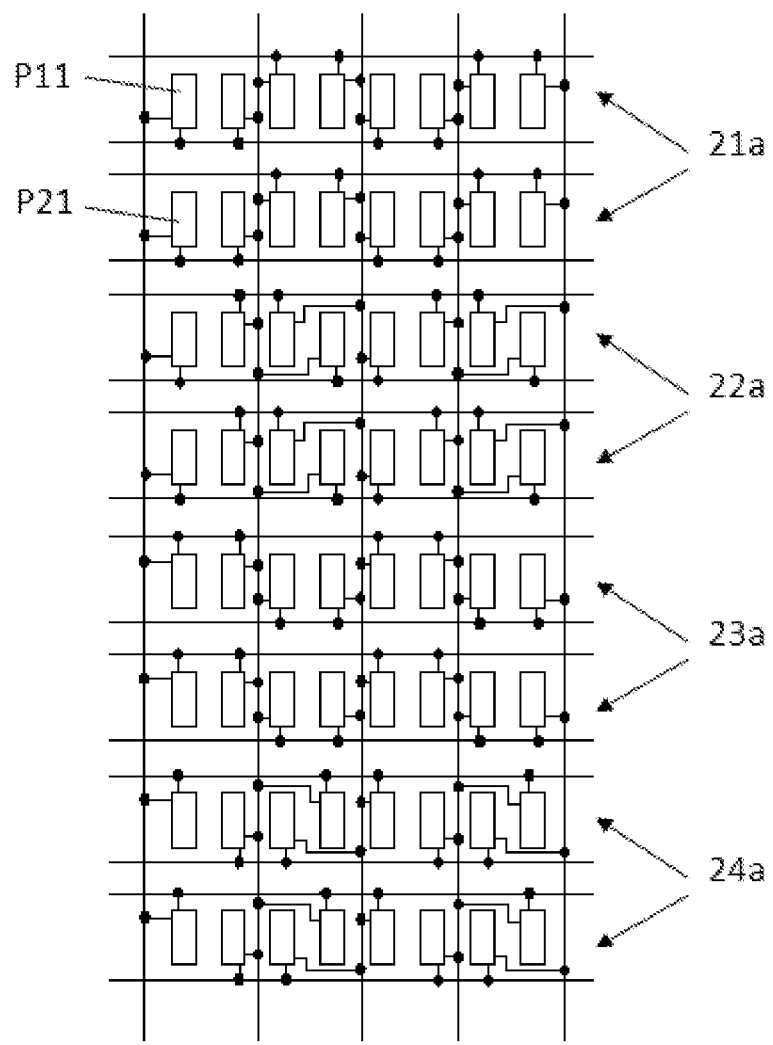
FIG. 6 is a schematic partial structural view of a data line share type array substrate according to embodiment 2 of the invention.

FIG. 6 is a schematic partial structural view of an array substrate provided by this embodiment. What is difference from the embodiment 1 is that: in this embodiment, along the arrangement direction of the scan lines, the sub-pixel array is divided into row groups 21a, 22a, 23a, 24a, each row group includes two rows of sub-pixels. Specifically, as illustrated in FIG. 6, the row group 21a includes the first and the second rows of sub-pixels, the row group 22a includes the third and the fourth rows of sub-pixels, the row group 23a includes the fifth and the sixth rows of sub-pixels, and the row group 24a includes the seventh and the eighth rows of sub-pixels.

A connection manner of one row of sub-pixels in each row group with data lines and scan lines is the same as a connection manner of the other one row of sub-pixels in the row group with data lines and scan lines, that is, two rows of sub-pixels are used as one repeating unit. For example, in the row group 21a, for all the sub-pixels in the first and the second rows, vertically adjacent two sub-pixels (e.g., P11 and P21) have a same connection manner, and the connection manner of all the sub-pixels in the first and the second rows with the data lines and the scan lines is the same as the connection manner of the row group 21 of the embodiment 1, and thus will not be repeated herein. Likewise, the row group 22a is corresponding to the row group 22 of the embodiment 1, the row group 23a is corresponding to the row group 23 of the embodiment 1, and row group 24a is corresponding to the row group 24 of the embodiment 1.

Figure 7:
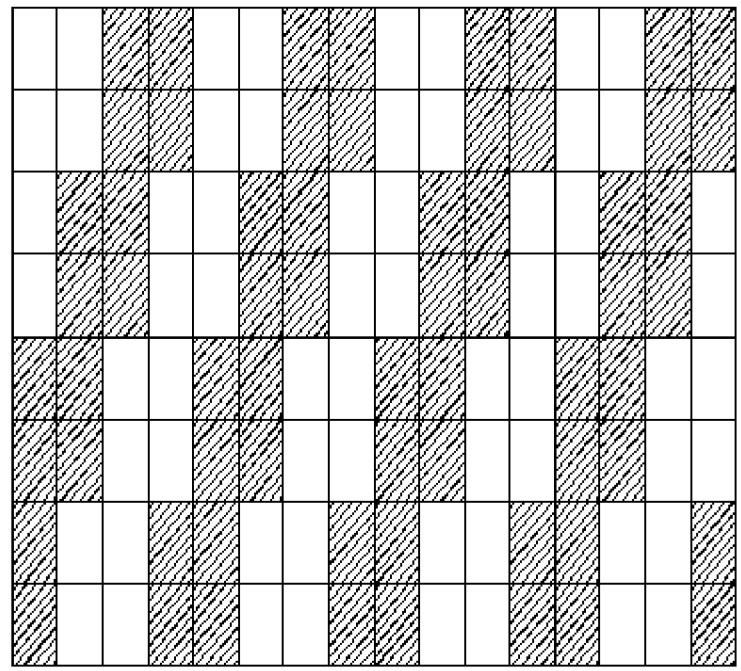
FIG. 7 is a schematic view of the array substrate after being charged according to the embodiment 2 of the invention.

An array substrate provided by this embodiment can be regarded as a structure obtained by repeating the partial structure as illustrated in FIG. 6 along transversal and longitudinal directions multiple times. FIG. 7 shows a distribution of well-charged sub-pixels and poorly-charged sub-pixels of the array substrate with the structure in a frame of image, the white areas represent the well-charged sub-pixels, and the shaded areas represent the poorly-charged sub-pixels.

[Embodiment 3]

Figure 8:
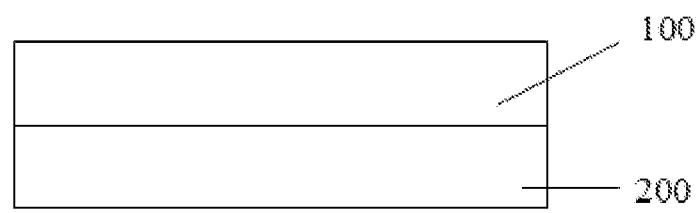
FIG. 8 is a schematic structural view of a liquid crystal display device according to embodiment 3 of the invention.
Figure 9:
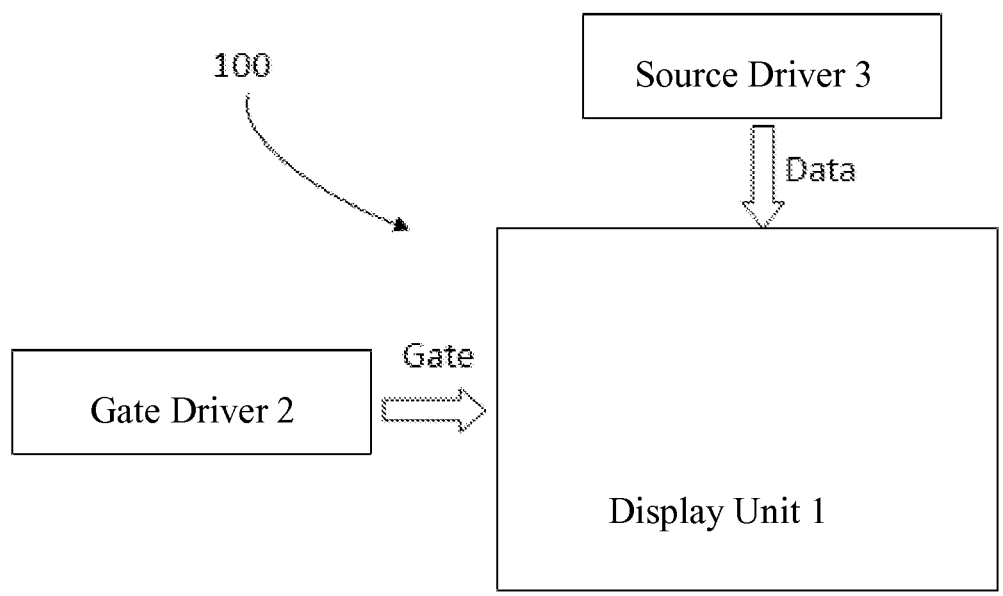
FIG. 9 is a schematic structural view of a liquid crystal panel according to the embodiment 3 of the invention.

Referring to FIG. 8 and FIG. 9, this embodiment provides a liquid crystal panel and a liquid crystal display device including the liquid crystal panel. As illustrated in FIG. 8, the liquid crystal display device includes a liquid crystal panel 100 and a backlight module 200. The liquid crystal panel 100 and the backlight module 200 are oppositely disposed. The backlight module 200 is configured (i.e., structured and arranged) for providing a display light source for the liquid crystal panel 100 and thereby facilitating the liquid crystal panel 100 to display an image.

As illustrated in FIG. 9, the liquid crystal panel 100 includes a display unit 1 formed with an array of sub-pixels, a gate driver 2 and a source driver 3. The gate driver 2 is configured for supplying scan signals Gate to the array of sub-pixels through scan lines, and the source driver 3 is configured for supplying data signals Data to the array of sub-pixels through data lines.

Figure 10:
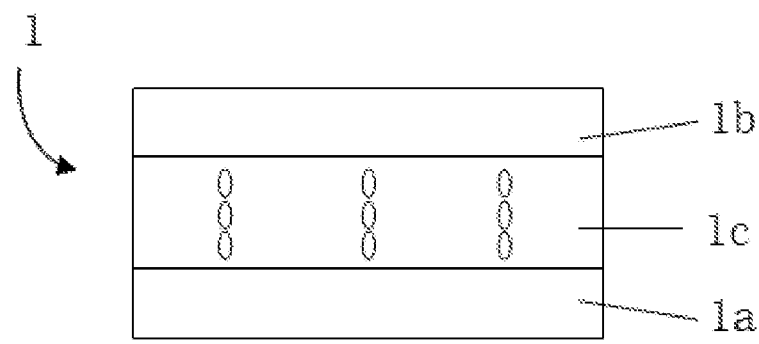
FIG. 10 is a schematic structural view of a display unit according to the embodiment 3 of the invention.

FIG. 10 is a schematic structural view of the display unit 1. The display unit 1 includes oppositely disposed array substrate 1a and color filter substrate 1b, and a liquid crystal layer 1c arranged between the array substrate 1a and the color filter substrate 1b. The array substrate 1a employs the array substrate provided by the embodiment 1 or the embodiment 2, and the sub-pixels Pxy includes a red sub-pixel, a green sub-pixel and a blue sub-pixel.

In summary, the array substrate provided by the embodiments of the invention, by way of the arrangement design of the connection manner of the sub-pixels with the data lines and scan lines in the array substrate, when is driven by a dot inversion driving method, each column of sub-pixels have intervally arranged well-charged sub-pixels and poorly-charged sub-pixels (herein, "well-charged" and "poorly-charged" are relative terms), so that in the liquid crystal panel including the array substrate, brightnesses of various areas are balanced on the whole, and therefore the drawback of the existence of bright and dark vertical lines can be improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An array substrate comprising:
   an array of sub-pixels;
   a plurality of data lines, wherein each two of the plurality of data lines define a column group arranged therebetween, and each column group comprises two columns of sub-pixels; sub-pixels in an odd column group each are connected to the closer one of two data lines at two sides of the column group; sub-pixels in odd rows of an even column group each are connected to the closer one of two data lines at two sides of the column group; sub-pixels in even rows of the even column group each are connected to the farther one of two data lines at two sides of the even column group;
   a plurality of scan lines, wherein top and bottom of each row of sub-pixels are disposed with scan lines only for driving the row of sub-pixels; the array of sub-pixels is divided into a plurality of row groups, and each row group comprises one row or two rows of sub-pixels; sub-pixels in even column groups of each row of an nth row group each are connected to the scan line on top of the row of sub-pixels, and sub-pixels in odd column groups of each row of the nth row group each are connected to the scan line on bottom of the row of sub-pixels; ith and (i+1)th sub-pixels in each row of an (n+1)th row group each are connected to the scan line on top of the row of sub-pixels, and jth and (j+3)th sub-pixels in each row of the (n+1)th row group each are connected to the scan line on bottom of the row of sub-pixels; sub-pixels in odd column groups of each row of an (n+2)th row group each are connected to the scan line on top of the row of sub-pixels, and the sub-pixels in even column groups of each row of the (n+2)th row group each are connected to the scan line on bottom of the row of sub-pixels; jth and (j+3)th sub-pixels in each row of an (n+3)th row group each are connected to the scan line on top of the row of sub-pixels, and ith and (i+1)th sub-pixels in each row of the (n+3)th row group each are connected to the scan line on bottom of the row of sub-pixels; where
   $n=1, 5, 9, \ldots, n-4, n$;
   $i=2, 6, 10, \ldots, i-4, i$;
   $j=1, 5, 9, \ldots, j-4, j$.

2. The array substrate according to claim 1, wherein each sub-pixel is connected to a corresponding data line and a corresponding scan line by a switching element.

3. The array substrate according to claim 2, wherein the switching element is a thin film transistor; a gate of the thin film transistor is electrically connected with the corresponding scan line, a source of the thin film transistor is electrically connected with the corresponding data line, and a drain of the thin film transistor is electrically connected with the corresponding sub-pixel.

4. A liquid crystal panel comprising a display unit, the display unit comprising oppositely disposed array substrate and color filter substrate and a liquid crystal layer disposed between the array substrate and the color filter substrate; the array substrate comprising:
   an array of sub-pixels;
   a plurality of data lines, wherein each two of the plurality of data lines define a column group arranged therebetween, and each column group comprises two columns of sub-pixels; sub-pixels in an odd column group each are connected to the closer one of two data lines at two sides of the column group; sub-pixels in odd rows of an even column group each are connected to the closer one of two data lines at two sides of the column group; sub-pixels in even rows of the even column group each are connected to the farther one of two data lines at two sides of the even column group;
   a plurality of scan lines, wherein top and bottom of each row of sub-pixels are disposed with scan lines only for driving the row of sub-pixels; the array of sub-pixels is divided into a plurality of row groups, and each row group comprises one row or two rows of sub-pixels; sub-pixels in even column groups of each row of an nth row group each are connected to the scan line on top of the row of sub-pixels, and sub-pixels in odd column groups of each row of the nth row group each are connected to the scan line on bottom of the row of sub-pixels; ith and (i+1)th sub-pixels in each row of an (n+1)th row group each are connected to the scan line on top of the row of sub-pixels, and jth and (j+3)th sub-pixels in each row of the (n+1)th row group each are connected to the scan line on bottom of the row of sub-pixels; sub-pixels in odd column groups of each row of an (n+2)th row group each are connected to the scan line on top of the row of sub-pixels, and the sub-pixels in even column groups of each row of the (n+2)th row group each are connected to the scan line on bottom of the row of sub-pixels; jth and (j+3)th sub-pixels in each row of an (n+3)th row group each are connected to the scan line on top of the row of sub-pixels, and ith and (i+1)th sub-pixels in each row of the (n+3)th row group each are connected to the scan line on bottom of the row of sub-pixels; where
   $n=1, 5, 9, \ldots, n-4, n$;
   $i=2, 6, 10, \ldots, i-4, I$;
   $j=1, 5, 9, \ldots, j-4, j$.

5. The liquid crystal panel according to claim 4, wherein each sub-pixel is connected to a corresponding data line and a corresponding scan line by a switching element.

6. The liquid crystal panel according to claim 5, wherein the switching element is a thin film transistor; a gate of the thin film transistor is electrically connected with the corresponding scan line, a source of the thin film transistor is electrically connected with the corresponding data line, and a drain of the thin film transistor is electrically connected with the corresponding sub-pixel.

7. The liquid crystal panel according to claim 4, wherein the liquid crystal panel further comprises a gate driver and a source driver; the gate driver is configured for supplying scan signals to the array of sub-pixels through the plurality of scan lines, and the source driver is configured for supplying data signals to the array of sub-pixels through the plurality of data lines.

8. The liquid crystal panel according to claim 4, wherein the array of sub-pixels comprises a red sub-pixel, a green sub-pixel and a blue sub-pixel.

9. The liquid crystal panel according to claim 4, wherein the liquid crystal panel is a dot inversion driven liquid crystal panel.

10. A liquid crystal display device comprising a liquid crystal panel and a backlight module, the liquid crystal panel and the backlight module being oppositely disposed, the backlight module being configured for providing a display light source for the liquid crystal panel and thereby facilitating the liquid crystal panel to display an image, the liquid crystal panel comprising a display unit, the display unit comprising oppositely disposed array substrate and color filter substrate and a liquid crystal layer disposed between the array substrate and the color filter substrate; the array substrate comprising:

an array of sub-pixels;

a plurality of data lines, wherein each two of the plurality of data lines define a column group arranged therebetween, and each column group comprises two columns of sub-pixels; sub-pixels in an odd column group each are connected to the closer one of two data lines at two sides of the column group; sub-pixels in odd rows of an even column group each are connected to the closer one of two data lines at two sides of the column group; sub-pixels in even rows of the even column group each are connected to the farther one of two data lines at two sides of the even column group;

a plurality of scan lines, wherein top and bottom of each row of sub-pixels are disposed with scan lines only for driving the row of sub-pixels; the array of sub-pixels is divided into a plurality of row groups, and each row group comprises one row or two rows of sub-pixels; sub-pixels in even column groups of each row of an nth row group each are connected to the scan line on top of the row of sub-pixels, and sub-pixels in odd column groups of each row of the nth row group each are connected to the scan line on bottom of the row of sub-pixels; ith and (i+1)th sub-pixels in each row of an (n+1)th row group each are connected to the scan line on top of the row of sub-pixels, and jth and (j+3)th sub-pixels in each row of the (n+1)th row group each are connected to the scan line on bottom of the row of sub-pixels; sub-pixels in odd column groups of each row of an (n+2)th row group each are connected to the scan line on top of the row of sub-pixels, and the sub-pixels in even column groups of each row of the (n+2)th row group each are connected to the scan line on bottom of the row of sub-pixels; jth and (j+3)th sub-pixels in each row of an (n+3)th row group each are connected to the scan line on top of the row of sub-pixels, and ith and (i+1)th sub-pixels in each row of the (n+3)th row group each are connected to the scan line on bottom of the row of sub-pixels; where n=1, 5, 9, . . . , n−4, n;
i=2, 6, 10, . . . , i−4, i;
j=1, 5, 9, . . . , j−4, j.

11. The liquid crystal display device according to claim 10, wherein each sub-pixel is connected to a corresponding data line and a corresponding scan line by a switching element.

12. The liquid crystal display device according to claim 11, wherein the switching element is a thin film transistor; a gate of the thin film transistor is electrically connected with the corresponding scan line, a source of the thin film transistor is electrically connected with the corresponding data line, and a drain of the thin film transistor is electrically connected with the corresponding sub-pixel.

13. The liquid crystal display device according to claim 10, wherein the liquid crystal panel further comprises a gate driver and a source driver; the gate driver is configured for supplying scan signals to the array of sub-pixels through the plurality of scan lines, and the source driver is configured for supplying data signals to the array of sub-pixels through the plurality of data lines.

14. The liquid crystal display device according to claim 10, wherein the array of sub-pixels comprises a red sub-pixel, a green sub-pixel and a blue sub-pixel.

15. The liquid crystal display device according to claim 10, wherein the liquid crystal panel is driven by a dot inversion driving method.

* * * * *